(12) United States Patent
Sharp et al.

(10) Patent No.: US 8,255,571 B2
(45) Date of Patent: Aug. 28, 2012

(54) UPDATING MULTIPLE COMPUTING DEVICES

(75) Inventors: Christopher Brooke Sharp, San Jose, CA (US); Karl Groethe, San Francisco, CA (US); Andy Belk, Menlo Park, CA (US); Stuart Slack, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 453 days.

(21) Appl. No.: 12/495,700

(22) Filed: Jun. 30, 2009

(65) Prior Publication Data

US 2010/0332682 A1 Dec. 30, 2010

(51) Int. Cl.
*G06F 15/16* (2006.01)
(52) U.S. Cl. ......... 709/248; 709/217; 709/218; 709/219
(58) Field of Classification Search .......... 709/217–219, 709/248
See application file for complete search history.

(56) References Cited

U.S. PATENT DOCUMENTS

| | | | |
|---|---|---|---|
| 5,862,346 A * | 1/1999 | Kley et al. | 709/245 |
| 6,161,146 A * | 12/2000 | Kley et al. | 709/248 |
| 6,538,635 B1 | 3/2003 | Ringot | |
| 7,117,491 B2 * | 10/2006 | Ferreira Alves et al. | 717/168 |
| 7,912,858 B2 * | 3/2011 | Fleck et al. | 707/783 |
| 2004/0044702 A1 * | 3/2004 | Ferreira Alves et al. | 707/203 |
| 2007/0288548 A1 * | 12/2007 | Creamer et al. | 709/202 |

* cited by examiner

*Primary Examiner* — Mohamed Wasel
(74) *Attorney, Agent, or Firm* — Fish & Richardson P.C.

(57) ABSTRACT

A system includes a server site that includes a memory for storing update data sets that correspond to data sets stored on multiple computing devices of a user. The system also includes a synchronization manager for determining that one computing device associated with the user and another computing device associated with the user are absent one or more data updates stored in the memory at the server site. The synchronization manager is configured to send in parallel, absent establishing a data transfer lock, the one or more data updates to the both computing devices of the user for updating the corresponding data stored on each computing device.

26 Claims, 10 Drawing Sheets

UPDATING MULTIPLE COMPUTING DEVICES

BACKGROUND

This disclosure relates to a system for updating multiple computing devices to account for data changes associated with one or more of the computing devices.

In the ever expanding fields of personal computing and electronic devices, individuals are more frequently purchasing and using multiple computing devices for both professional and recreational applications. Often such applications rely upon a user to monitor and adjust data on each device, as changes occur. For example, a user may be required to update each of his electronic devices (e.g., a computer system, cellular telephone, etc.) when his home address changes. Along with the time and effort that an individual expends to keep the data current on each device, the individual needs to guard against accidentally causing data on multiple devices to conflict.

SUMMARY

Disclosed herein are systems and methods for managing the updating of data on multiple computing devices associated with a user. By allowing multiple computing devices to receive data updates absent establishing a data transfer lock with an update repository, the devices may be updated in parallel. Further, reducing the demand on the data transfer lock, allows the lock to be used to provide update data (e.g., based on user interactions) to the update repository.

In some implementations, a system includes a server site that includes a memory for storing update data sets that correspond to data sets stored on multiple computing devices of a user. The system also includes a synchronization manager for determining that at least a first computing device associated with the user and a second computing device associated with the user are absent at least a first data update stored in the memory at the server site, the synchronization manager is configured to send in parallel, absent establishing a data transfer lock, the at least first data update to the first computing device and the second computing device of the user for updating the corresponding data stored on each computing device.

In other implementations, a system includes first computing device associated with a user. The first computing device includes a memory for storing update data sets to update corresponding stored data sets. The first computing device also includes a synchronizer for determining that the first computing device is absent at least a first data update stored at a server site. The synchronizer is configured to receive the at least first data update from the server site absent establishing a data transfer lock and in parallel with a second computing device receiving the at least first data update absent of establishing a data transfer lock.

In other implementations, a method includes determining that at least a first computing device associated with a user and a second computing device associated with the user are absent at least a first data update stored at a server site. The method also includes, in parallel, sending the at least first data update from the server site to the first computing device and to the second computing device of the user to update corresponding data stored on each computing device. Sending the at least first data update occurs absent establishing a data transfer lock.

In other implementations, a method includes determining that at least a first and a second computing device associated with a user are absent at least a first data update stored at a server site. The method also includes, in parallel, receiving the at least first data update from the server site at the first computing device and the second computing device of the user to update corresponding data stored on each computing device, wherein receiving the at least first data update occurs absent establishing a data transfer lock.

In other implementations, one or more computer readable media store instructions that are executable by a processing device, and upon such execution cause the processing device to perform operations that include determining that at least a first computing device associated with a user and a second computing device associated with the user are absent at least a first data update stored at a server site. Execution of the instructions also cause the processing device to perform operations that include, in parallel, sending the at least first data update from the server site to the first computing device and to the second computing device of the user to update corresponding data stored on each computing device, wherein sending the at least first data update occurs absent establishing a data transfer lock.

In still other implementations, one or more computer readable media store instructions that are executable by a processing device, and upon such execution cause the processing device to perform operations that include determining that at least a first and a second computing device associated with a user are absent at least a first data update stored at a server site. Execution of the instructions also cause the processing device to perform operations that include, in parallel, receiving the at least first data update from the server site at the first computing device and the second computing device of the user to update corresponding data stored on each computing device, wherein receiving the at least first data update occurs absent establishing a data transfer lock.

These and other aspects and features and various combinations of them may be expressed as methods, apparatus, systems, means for performing functions, program products, and in other ways.

Other features and advantages will be apparent from the description.

DESCRIPTION OF DRAWINGS

Like reference symbols in the various drawings indicate like elements.

DETAILED DESCRIPTION

Figure 1:
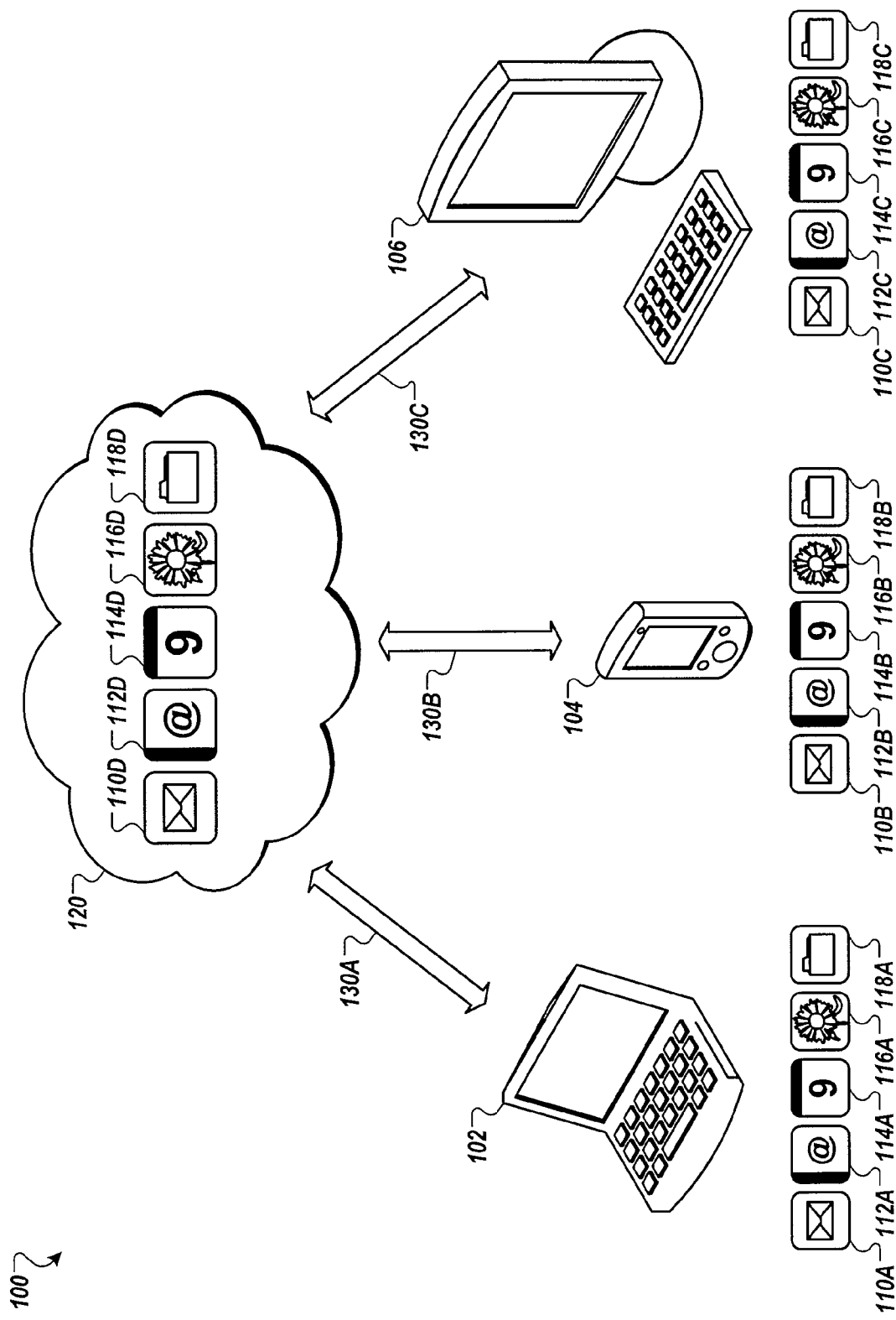
FIG. 1 illustrates a synchronization system for synchronizing data associated with multiple computing devices.

Referring to FIG. 1, exemplary synchronization system 100 is illustrated that can synchronize content associated with multiple computing devices. An individual user (or a group of users) may use multiple computing devices, such as desktop computers, laptop computers, personal digital assistants (PDAs), and cellular telephones, to name a few possibilities. For example, a user may have a desktop computer at work, a laptop computer at home, and a PDA or cell phone when away from work or home. By using the computing devices, various applications may interact (e.g., create, access, organize, modify, delete, etc.) with data, such as email, contacts, appointments, images, and files (to name a few possibilities) associated with the devices. To assist the user with the applications that reside on each device, copies of data (e.g., contact data) may be provided to each of the computing devices. However, a user or an application may cause data to be changed on one of the devices. Along with being alerted to such changes, synchronization system 100 provides data to one or more of the other devices associated with the user such that similar data changes are reflected on each device.

Synchronization system 100 may assist numerous users to update data on multiple computing devices (associated with each user). However, for ease of discussion, synchronization system 100 is illustrated as interacting with multiple computing devices of a single user. For example, synchronization system 100 includes a laptop computer 102, cell phone 104, and desktop computer 106. Each of the computing devices 102, 104, 106 may enable a user to use one or more software applications (e.g., e-mail, contact lists, calendars, graphics applications, file managers, etc.) to interact with various kinds of data. To illustrate several possible examples, an e-mail application may be employed by the user to interact with e-mail data (110A-D), a contact list application may be used to interact with contact data (112A-D), a calendar application may be used to interact with calendar data (114A-D), a graphics or camera application may be used to interact with image data (116A-D), and a file manager application may be used to interact with file data (118A-D). To provide such functionality, computing devices 102, 104, and 106 can execute software and include one or more hardware components such as processing devices (e.g., one or more microprocessors), input devices (e.g., keyboards, computer mice, tablets, cameras, etc.), output devices (e.g., displays) and storage devices (e.g., memories, hard drives, CD-ROMS, etc.).

For managing changes in data residing at the computing devices, one or more synchronization techniques and methodologies may be implemented. In one arrangement, synchronization techniques may be employed to propagate content additions, modifications, or deletions from one computing device to one or more other devices. For example, a computer software application executed at any of computing devices 102, 104, or 106 may be used to interact with data, and synchronization system 100 can synchronize any or all of the other computing devices 102, 104, or 106 to reflect data changes. For some techniques, data synchronization may be performed in a serial manner. For example, as one device executes synchronization operations (e.g., reading, writing, etc.) to address data changes, synchronization system 100 may block other devices from performing similar operations until the first device is complete. Once complete, the other devices may then execute synchronization operations, although still complying with the serial manner. As such, updating data on each device may take a considerable amount of time. Additionally, due to the serial manner, some devices remain idle for extended time periods while waiting to update. In some situations, errors or software malfunctions may be experienced by one or more of the idle devices.

To increase data updating speed, parallel operation execution may be incorporated into synchronization system 100. For example, reading operations may be performed by multiple devices in parallel. As such, upon the appearance of one or more data changes (e.g., caused by the device user), multiple other devices may perform parallel read operations to synchronize device instances of the data. Such synchronization techniques may enable any of the computing devices (e.g., devices 102, 104, or 106) of synchronization system 100 to reflect data changes experienced at one or more of the other devices.

To facilitate data exchange, access to data and data changes may be provided through network 120 (e.g., the Internet). For example, network 120 may include one or more servers hosting data (e.g., e-mail data 110D, contact data 112D, calendar data 114D, image data 116D, file data 118D, etc.) or changes to the data, which may be accessible by one or more computing devices (e.g., laptop computer 102, cell phone 104, desktop computer 106, etc.). In one situation, laptop computer 102 may access content on network 120 using connection 130A, cell phone 104 may access network content using connection 130B, and desktop computer 106 may access network content using connection 130C. Such connections may be wired, wireless or a combination. To control the access to the data, software may be executed by one or more computers associated with network 120. For example, access to any or all of the data 110D, 112D, 114D, 116D, or 118D, or changes to the data, can be granted or denied for a set of computing devices in synchronization system 100. In some implementations, one set of data or data changes may be provided through network 120 for one computing device (or group of computing devices), and another set of data or data changes may be provided for another device or group of computing devices. Any or all of the data (e.g., data 110D, 112D, 114D, 116D, 118D, etc.) may be provided on the same or on different servers of network 120.

To update data residing on the computing devices associated with a user, data and data changes may be transferred from a computing device in synchronization system 100 to one or more of the other devices in the system. For example, a user of cell phone 104 may use a camera to capture image data 116B. As another example, the user of cell phone 104 may use a graphics application to apply an effect or modification to image data 116B. Image data 116B may be stored locally by cell phone 104 and sent to a server associated with network 120, using connection 130B. As represented by image data 116D, images or image modifications can be subsequently exchanged to other devices in synchronization system 100. For example, image data 116D may be stored on a server associated with network 120 and distributed to laptop computer 102 using connection 130A. Additionally, image data 116D may be provided to desktop computer 106 using connection 130C. Once received, local instances of the image data 116D may be produced (and stored). For example, image data 116B of cell phone 104 may be stored locally at laptop computer 102 and desktop computer 106 as respective instances (e.g., image data 116A and image data 116C).

In some implementations, a web interface may be used to provide one or more users with access to data. For example, device users may interact with data using web browser applications being executed on the computing devices (e.g., devices 102, 104, 106) that are connected to network 120. As such, data or data changes residing at network 120 may be accessed and distributed to one or more of computing devices. For example, a user may use laptop computer 102 to modify data (e.g., calendar data 114D) through a web browser application. In one instance, the user may change an appointment time or other related calendar information. Such changes may then be provided to the other computing devices associated with the user. For example, changes to calendar data 114D may be distributed to laptop computer 102, cell phone 104 and desktop computer 106. Upon receipt, each change in data may be locally stored and used in various applications (on the computing devices).

Figure 2:
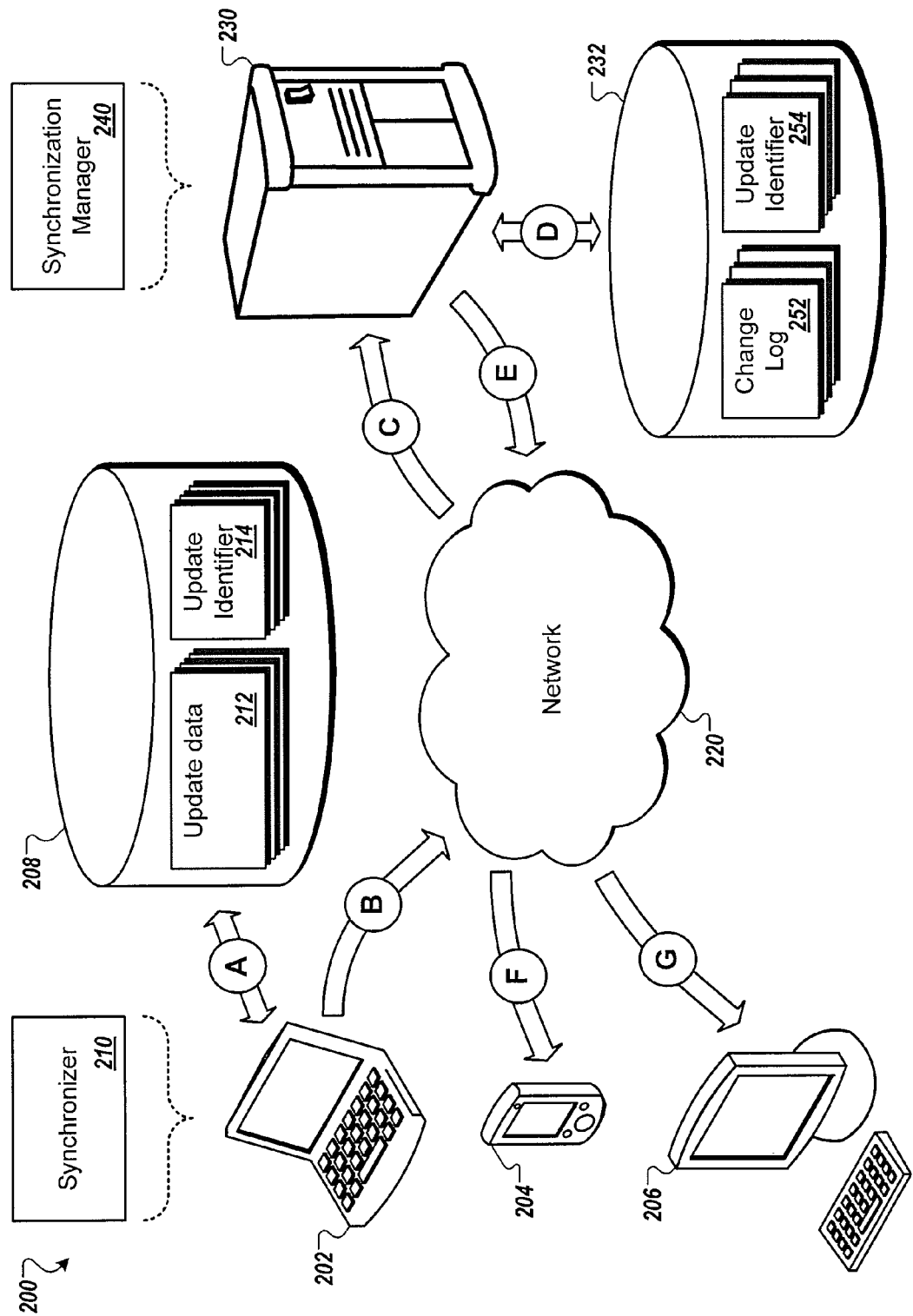
FIG. 2 illustrates components of a synchronization system.

Referring to FIG. 2, components of an exemplary synchronization system 200 are illustrated. Similar to synchronization system 100 (shown in FIG. 1), synchronization system 200 is capable of performing various operations (e.g., interacting with data, updating data, etc.) to synchronize data. In this particular example, synchronization system 200 includes laptop computer 202, cell phone 204 and desktop computer 206 (similar to the computing devices shown in FIG. 1). Typically, each of the computing devices 202, 204, 206 may be in communication with one or more storage devices (e.g., a hard drive, a CD-ROM, etc.). For example, laptop computer 202, as shown by communication arrow A, may be in communication with storage device 208. To assist the user, each of the computing devices 202, 204, 206 typically includes software such as applications (e.g., e-mail application, contact lists, calendars, graphics applications, file managers, etc.) for producing and interacting with various types of data (e.g., e-mail messages, contact entries and information, etc.). While such applications and related data is typically implemented in software, in some arrangements, such functionality may be partially or completely implemented in hardware (e.g., circuitry) or a combination of hardware and software. Further, functionally may be provided in one or more distinct articles of software. As such, the functionality of the module may be distributed across multiple software modules.

To synchronize data transfer and data changes (e.g., data updates), each of the computing devices associated with the user may execute a synchronizer. For ease of illustration, synchronizer 210 is represented as being executed by laptop 202. Similarly, cell phone 204 and desktop computer 206 execute similar synchronizers (that are not shown). Synchronizer 210 provides various capabilities such as tracking changes to data (e.g., email data, contact data, calendar data, image data, file data, etc.) associated with the computing device executing it (e.g., laptop 202). Similarly, synchronizers executed by the other computing devices (e.g., cell phone 204, desktop computer 206, etc.) respectively track data changes. For example, the user of laptop computer 202 may interact with data such as contact information, using a contact manager application. Changes (e.g., additions, deletions, edits, etc.) to the data may be monitored by synchronizer 210, and information representative of the changes may be stored to storage device 208. For instance, the user may update a contact phone number, and synchronizer 210 can monitor the update, produce update data 212 that represents the change in data, and store update data 212 to storage device 208. As another example, the user may add one or more new contacts or remove an existing contact. Similarly, synchronizer 210 can monitor and represent such additions and deletions in update data 212, and store the data to storage device 208.

In some implementations, synchronization operations may be initiated by any of the computing devices (e.g., laptop computer 202, cell phone 204, desktop computer 206, etc.). For example, synchronization operations may be triggered upon the detection of a change in data, execution of a particular operation (e.g., saving a contact entry, sending an email, capturing a photo image, etc.), initiating execution of an application, or other similar event. Synchronization may also be triggered by detecting a particular amount of data (e.g., sixteen bytes, thirty-two bytes, etc.) has been changed or upon the expiring of a predefined time interval (e.g., 10 seconds, 1 minute, 5 minutes, etc.).

In one example, upon the user correcting the spelling of a contact name and saving the correction, synchronizer 210 may initiate laptop computer 202 into uploading the data change for distribution to cell phone 204 and desktop computer 206. As shown by process arrow A, laptop computer 202 can use synchronizer 210 to retrieve update data 212 from storage device 208. As shown by process arrows B and C, synchronizer 210 may initiate the sending of update data 212 over network 220 (e.g., the Internet) to synchronization server 230. Various types of equipment and architectures may be used to control and manage data synchronizing of multiple computing devices (associated with a user). In one instance, multiple synchronization servers may be included in synchronization system 200. For example, one or more synchronization servers may be associated with a group of computing devices (e.g., devices associated with employees of company X), and one or more other synchronization servers may be associated with another group of computing devices (e.g., devices associated with employees of company Y). Server assignments, or other architecture schemes may also be utilized that are based on other conditions and parameters such as data type (e.g., e-mail data), data size, data update frequency, etc. Similar to the computing devices, typically, each synchronization server may be in communication with one or more storage devices (e.g., a memory, a hard drive, a CD-ROM, etc.). As shown by communication arrow D, for example, synchronization server 230 may be in communication with storage device 232.

To provide synchronization operations, synchronization server 230 includes a software module such as synchronization manager 240, however, in some arrangements, the functionality of the module may be incorporated into a hardware (e.g., circuitry) or a combination of hardware and software. Further, while one distinct module is illustrated for synchronization manager 240, the functionality of the module may be distributed across multiple modules (e.g., two or more). The synchronization manager 240 can manage synchronization operations among multiple computing devices (e.g., laptop computer 202, cell phone 204, desktop computer 206, etc.). For example, synchronization manager 240 can receive update data 212 from laptop computer 202, save representative data (e.g., such as one or more change logs 252 at synchronization server 230), and update other computing devices (e.g., cell phone 204, desktop computer 206, etc.) by providing the changes in data. Along with updating devices, synchronization manager 240 can also track data updates. For example, update identifiers 254 may be produced (by synchronization manager 240) that respectively represent the status of the change logs 252. As such, as each change log is altered (to include a data update), a corresponding update identifier may be altered to indicate that a change has occurred to the change log. One or more techniques may be used for producing and altering update identifier(s) 254. For example, each update identifier 254 may be a unique or nearly unique numerical value, provided by random number generation, hashing algorithms, indexing, time stamping, or other similar techniques. In some arrangements, an electronic tag (e-tag) provides the update identifier. In one arrangement, for each instance that an update (e.g., one of the computing devices receives new contact information) is received and represented in the appropriate change log, the update identifier associated with the change log is altered (e.g., assigned a new random number). One altered, the altered update identifier may be stored, along with the updated change log, to storage device 232 by synchronization manager 240. As such, along with tracking data updates from each computing device, a numerical value may be used to represent each update. By using this technique, the synchronization manager can quickly determine if each computing device is current in regards to update data provided to the synchronization server 230.

Along receiving updating data from one or multiple computing devices, synchronization manager 240 is also capable of providing update material to one or more of the computing devices. For multiple devices, the synchronization manager 240 may provide the update data in parallel to multiple computing devices. For example, upon receiving update data 212 from laptop computer 202, synchronization manager 240 can provide the update data to desktop computer 206 and cell phone 204. In one arrangement, prior to providing the update data, a notification is sent to cell phone 204 and desktop computer 206 that alerts each computing device that one or more data changes have occurred and both may need to be updated. Such notification may include various types of information, for example, one or more update identifiers 254 may be included to indicate changes with associated change log(s) 252. In one arrangement, each update identifier 254 represents the current version of update data stored in the associated change log. For example, for each instance that a data update is received that changes the version of the data associated with a change log, the corresponding update identifier is changed to also reflect the version change.

By storing update identifiers 254 at the synchronization server 230, synchronization manager 240 may be capable of tracking the current version of data updates associated with each of the change logs. In a similar manner, by storing update identifiers at the computing devices, the current version of data stored on the computing devices may be tracked. In this particular illustration, update identifiers 214 are stored (on storage device 208) for tracking updates to laptop 202. For example, as updates are provided to laptop 202, update identifiers 214 are changed to reflect the updated version of the data currently on the laptop. Once locally stored, update identifier(s) 214 may be used in comparisons (e.g., with update identifiers 254 at synchronization server 230) to determine whether data present on laptop 202 needs to be updated and if the needed updates are available (at synchronization server 230). As graphically illustrated with process arrows E, F and G, data updates and corresponding update identifiers may be provided by the synchronization server 230 to cell phone 204 and desktop computer 206 via network 220. In some arrangements, synchronization server 230 allows the multiple devices (e.g., cell phone 204 and desktop computer 206) to receive data updates in parallel, thereby reducing the time for update period and conserve the use of computing resources.

Figure 3:
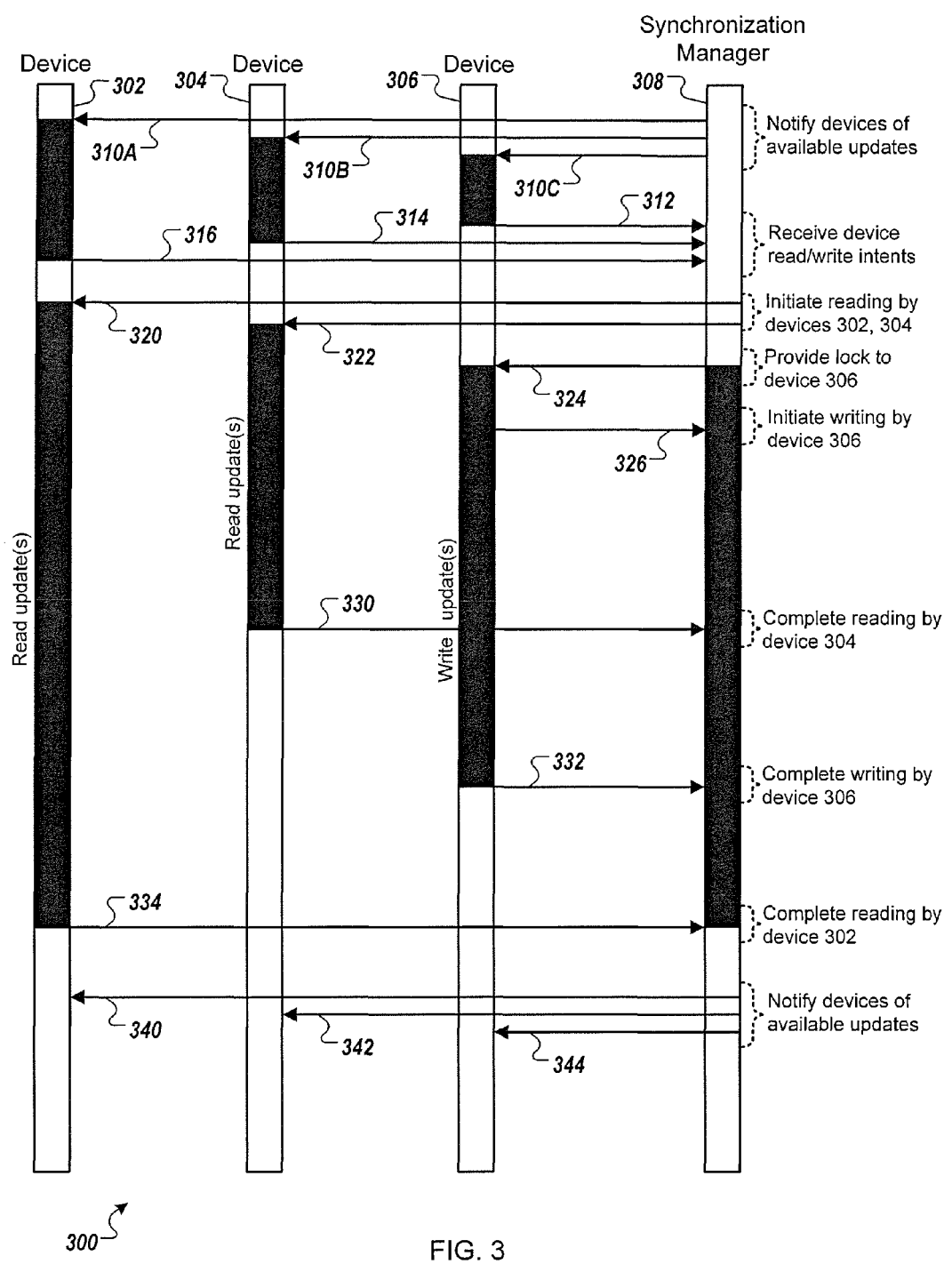
FIG. 3 is a process diagram that represents interactions among devices and a synchronization manager.

Referring to FIG. 3, process diagram 300 represents exemplary interactions among multiple computing devices (e.g., devices 302, 304, and 306) of a user and synchronization manager 308. For example, computing devices 302, 304, and 306 may represent computing devices such as laptop computer 202, cell phone 204 and desktop computer 206 (shown in FIG. 2). Similarly, synchronization manager 308, may perform operations similar to operations of synchronization manager 240 (also shown in FIG. 2). The operations performed by the computing devices may be provided by a synchronizer such as synchronizer 210 (also shown in FIG. 2), however for ease of illustration, such operations are simply referred to operations performed by the computing device.

As coordinated by synchronization manager 308, each of computing devices 302, 304, and 306 may independently perform synchronization operations (e.g., reading and writing of data updates). For example, multiple computing devices may read data changes in parallel (e.g., from a synchronization server) while another computing device provides one or more data changes (e.g., to the synchronization server). By allowing parallel operations, the computing devices experience less idle periods while waiting to execute operations in a serial manner. As such, computational efficiency increases and the time needed to update each computing device (associated with a user) decreases. In this illustrative example, process diagram 300 represents the operations for computing devices 302 and 304 reading data updates, in parallel, from the server site of synchronization manager 308. Also illustrated by process diagram 300, during these parallel read operations, computing device 306 provides (e.g., writes) data changes (e.g., a data update) to synchronization manager 308 for storing on the synchronization manager.

To initiate the operations in this example, synchronization manager 308 notifies computing devices 302, 304, 306 if one or more updates are available (from the synchronization server site). As shown by process arrows 310A, B and C, synchronization manager 308 may respectively provide notification (e.g., a message, signal, etc.) to each of computing devices 302, 304, and 308 as an alert that one or more data updates are available. For example, updated data (e.g., new contact information) may have been received by synchronization manager 308 (and stored at the server site). Various types of information may be included in such notifications. For example, a notification may include information that represents the available data changes. An update identifier may also be included that represents the current update version being stored at the synchronization server site. In one example, due to a recent update, a corresponding update identifier (stored at the synchronization server site) may have a version number incremented (e.g., from version 7 to version 8) to indicate the recent update. By providing the notification, the computing devices are alerted to the newly incremented version (e.g., the notification includes information that version 8 is available at the synchronization server site). Upon being notified, the computing devices may perform one or more operations. For example, to determine if update data needs to be attained (e.g., downloaded from the server) or is already locally present, each computing device may compare the update identifiers provided by synchronization manager 308 (in the notification) with respective update identifiers locally stored (at each device). For example, computing device 302 may retrieve the appropriate locally stored update identifier (e.g., representing that data update version 7 is presently stored on the device) for comparing to the update identifier provided in the notification (e.g., representing that version 8 is available at the synchronization server). From the comparison, computing device 302 can determine if an update is needed from the synchronization server. In this instance, data update version 8 needs to be provided to computing device 302 from the synchronization server. Along with indicating that a single update is needed, multiple update versions may be identified as being needed by the computing device. For example, based on the comparison of update identifiers (e.g., version 6 being present on computing device 304 and version 8 being present on the synchronization server), computing device 304 may identify multiple updates (e.g., versions 7 and 8) that are needed. As such, two or more data updates may be identified for downloading from the synchronization server.

In this illustration, device 306 may determine that all currently available data updates have been attained from synchronization manager 308. Computing device 306 may arrive at the determination by comparing the update identifiers included in the notification (provided by synchronization manager 308) with the corresponding update identifiers stored locally on the device. Based on the comparison, computing device 306 may also determine that one or more locally held data updates (e.g., stored on the device) are not present at the synchronization server site (of synchronization manager 308). For example, based upon user interaction, device 306 may have update data that needs to be provided to the synchronization server (for disseminating to the other computing devices). Additionally, in this example, computing device 306 may determine that one recent data update (e.g., the version 8 data update) currently resides on the device and is not needed from the synchronization server. As shown by process arrow 312, device 306 may inform synchronization manager 308 (e.g., send message) that the device intends to provide (e.g., upload) a data update to the synchronization server. In some arrangements, computing device 306 may inform synchronization manager 308 that device 306 does not intent to request update from the synchronization server.

Similar to computing device 306, computing devices 302 and 304 respectively determine if one or more updates present at the synchronization server are needed. For example, computing devices 302 and 304 may compare an update identifier provided by synchronization manager 308 (in the notification) with a counterpart identifier stored locally in the respective device (similar to the operations of computing device 306). Additionally, computing devices 302 and 304 may determine if updates present on the device (based on user interaction) need to be provided to the synchronization server (via synchronization manager 308). A shown by process arrow 314, in this example, computing device 304 informs synchronization manager 308 that one or more updates are needed (e.g., to be downloaded) from the synchronization server, while no updates need to be provided (e.g. uploaded) from the device to the synchronization server. Similarly, process arrow 316 illustrates computing device 302 providing a similar intent (e.g., no update to be uploaded, one or more updates needed from the synchronization server). Once this information is received, synchronization manger 308 may initiate operations to provide the requested updated to the computing devices. For example, as shown by process arrows 320 and 322, in parallel devices 302 and 304 are provided the needed data updates from synchronization manager 308.

While data updates may be provided (from the synchronization server) in parallel to multiple computing devices (e.g., parallel read operations), typically just one computing device may provide a particular update to the synchronization server (e.g., a single write operation). By limiting such updates being provided to the synchronization server, the probability for uploading conflicting date is reduced. To allow a single computing device to provide update data to the synchronization server (during a period of time), one or more techniques may be implemented. For example, data transfer locking techniques such as using a data locking protocol may be observed by computing devices 302, 304, 306 and synchronization manager 308. By using such data locking techniques, one computing device may be enabled to exclusively perform write operations during a time period. In some arrangements, data locking may apply to a particular type of data. For example, one computing device may obtain a lock for providing (e.g., writing) contact data to the synchronization server, and another computing device may simultaneously obtain a lock for providing image data. In general, when a computing device has experienced data changes (e.g., by user interaction) that need to be distributed to one or more other devices associated with the user, the device (that experienced the data changes) may obtain an exclusive lock for providing the data changes to the synchronization server. As illustrated by process arrow 324, computing device 306 may be provided a lock from synchronization manager 308, thereby enabling computing device 306 to exclusively provide data changes to synchronization manager 308. For the situation in which multiple computing devices attempt to obtain a lock during the same time period, one or more techniques may be implemented to manage the devices. For example, if one device has obtained a lock (and is in the process of providing data), other devices may be denied the lock until the data transfer is complete. During this time period of being denied, a computing device may repetitively request a lock until one is available. For instance, at predefined time intervals (e.g., once every 5 seconds, 10 seconds, 30 seconds, etc.) computing device 306 may issue a request for a lock until synchronization manager 308 determines that a lock may be provided to computing device 306 (e.g., another device has completed transferring its update). Implementing another management technique, synchronization manager 308 may queue the computing devices seeking a lock and respectively notify each device when a lock is available.

While synchronization manager 308 may grant a lock to computing devices in a serial manner to reduce the probability of conflicting write operations, read operations may be executed independent of the lock. For example, as one computing device is granted a lock and starts providing one or more updates to a synchronization server, one or more other computing devices may be simultaneously reading updates from the server. For example, computing device 306 may be granted a lock for providing update data to synchronization manager 308 while one or both of computing devices 302 and 304 may perform read operations (for updates available at the synchronization server). By executing read operations independent of lock status, a lock may be granted before or after read operations have initiated. For example, synchronization manager 308 may grant a lock to computing device 306 before or after other devices (e.g., computing devices 302 and 304) have initiated reading update data from the synchronization server.

Upon being granted a lock by synchronization manager 308, computing devices may also execute operations to determine if additional updates have appeared at the synchronization server while the lock is enabled. For example, if one or more updates have appeared while the computing device was locked (to perform write operations), the computing device may request that the lock be removed so that the newly appearing updates may be read and stored on the device. Determining if an update has appeared on the synchronization server may be performed by comparing update identifiers. For example, while in a locked state, a computing device may receive an update identifier from the synchronization manager 308 (e.g., that provides the current version of an update stored on the synchronization server). If the computing device is lacking this update (or multiple updates), the computing device may release the lock (or request a lock release) and initiate read operations to receive the update(s) from the synchronization server. Once the update or updates have been received, the computing device may attempt to reacquire the lock and return to providing data (e.g., executing write operations) to the synchronization server.

The process diagram 300 illustrates multiple computing devices performing read operations in parallel with a single computing device performing write operations with a lock established. In particular, process arrow 320 and 322 represent respective computing devices 302 and 304 initiating read operations. As illustrated by process arrow 326, upon acquiring a lock from the synchronization manager 308, computing device 306 initiates write operations in parallel (with the read operations). During the read operations, in this example computing devices 302 and 304 read the appropriate data updates so the version of the data stored on the computing devices matches the current version of the data available on the synchronization server. As illustrated in process diagram 300, the time period to complete read and write operations may vary. For example, the time period needed to complete the read operations of computing device 302 may be longer than the time period needed by computing device 304 to complete the read operations. For computing device 302, the read operation time period is illustrated as the vertical distance between process arrow 320 and process arrow 334. Similarly, although a shorter period of time, the read operations are executed by computing device 304 are defined by the vertical distance between process arrow 322 and process arrow 330. In this example, the time duration of the write operations (defined as the vertical distance between process arrow 326 and process arrow 332) for computing device 306 is between the read durations of computing devices 302 and 304. Duration variation associated with reading and writing operations may be attributed to data transfer rates, amounts of data to be transferred, processing speed, or other device and data transfer parameters.

In some implementations, upon a computing device completing read or write operations, synchronization manager 308 may provide the current update identifiers from the synchronization server to the computing devices (or multiple computing devices). By providing the current update identifiers, the computing device (or multiple computing devices) are notified to any updates that may have been provided to the synchronization server as the read or write operations were being executed. Upon being received, the respective computing devices may compare the update identifiers with locally stored update identifiers to determine if additional data updates are needed from the synchronization server.

In some implementations, upon the completion of a computing device providing update data to the synchronization server, synchronization manager 308 may provide notifications to one or more of the computing devices. Similarly, synchronization manager 308 may send notifications upon one or more computing devices completing read operations from the synchronization server. Whether being sent at the completion of a read operation or a write operation, such notification may be used by the computing devices to determine if additional updates are available from the synchronization server. For example, as shown by process arrows 340, 342, and 344, synchronization manager 308 may provide notification to devices 302, 304, and 306 as an alert that at least one data update (provided from the write operation of computing device 306) is available. Along with providing such notifications based upon the completion of a write operation, other events may trigger the sending of notifications. For example, upon the expiration of a predefined time period, notifications may be sent to one or more computing devices. In another example, if an update request is received from one or more computing devices, synchronization manager 308 may initiate notifications to be sent.

Figure 4:
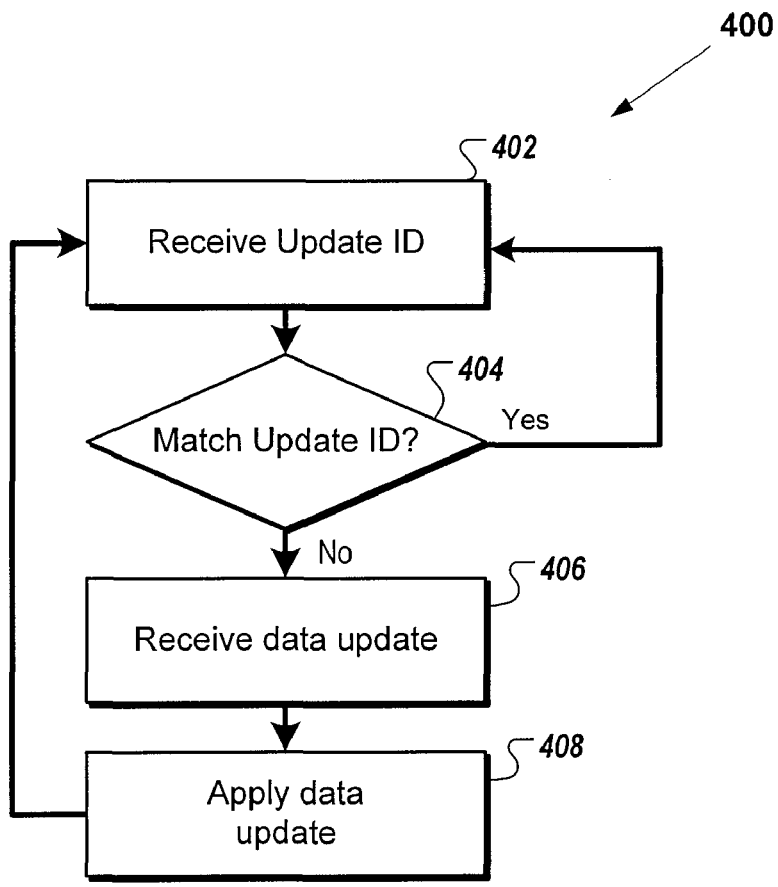
FIGS. 4, 5 and 9 are flow charts that represent operations of a synchronizer.

Referring to FIG. 4, a flowchart 400 represents some of the operations of synchronizer 210 (shown in FIG. 2). As mention above, synchronizer 210 may be executed at one (of multiple) computing devices (e.g., laptop 202, cell phone 204, desktop computer 206) associated with a user. Along with being executed at a single computing device, operation execution may also be distributed among two or more computing devices. For example, some operations may be executed on laptop 202 while other operations may be executed on the desktop computer 206.

One capability of synchronizer 210 is to read data updates from a server site (e.g., server site of synchronization manager 240) that corresponds to one or more data sets stored locally on the computing device (e.g., that executes the synchronizer). To provide this functionality, the synchronizer may execute various types of operations. For example, operations of the synchronizer 210 may include receiving 402 an update identifier (or multiple update identifiers) from the server site. In some arrangements, the update identifier (or multiple update identifiers) are provided in a notification from the server site. Upon receiving the update identifier, operations may also includes determining 404 if the received update identifier matches the counterpart update identifier locally stored on the computing device. For example, a locally stored electronic tag (e-tag) may be compared to the corresponding e-tag provided by the server. If the comparison determines that the two update identifiers are equivalent, and a data transfer is not needed. As such operations may include returning to receive additional update identifiers.

For the situation when the received update identifier is not equivalent to the locally stored update identifier, a read operations may be needed. As such, operations may include receiving 406 data from the server site that represents the updates. Upon receiving the update data, operations of synchronizer 210 may also include applying 408 the data updates. For example the update data may be merged to appropriate data stored on the computing device.

Figure 5:
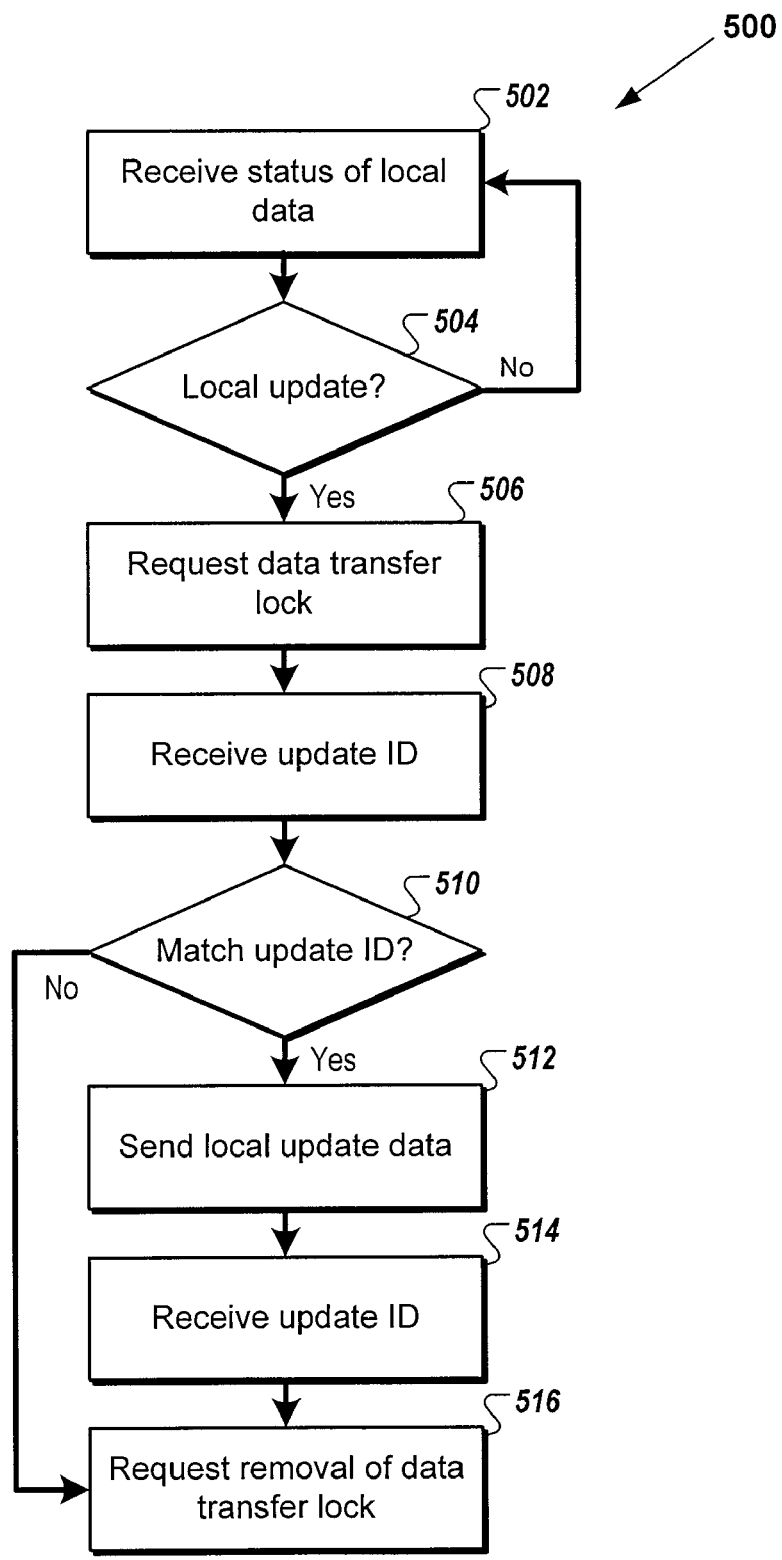

Referring to FIG. 5, a flowchart 500 represents additional operations of synchronizer 210 (shown in FIG. 2). Similar to the operations shown in FIG. 4, synchronizer 210 may be executed at one (of multiple) computing devices associated with a user. Further, along with executing the operations on a single computing device, execution may also be distributed among two or more computing devices.

Similar to the reading functionality of synchronizer 210 described with respect to the flowchart 400, another capability of the synchronizer is to provide locally detected data updates to a server site (e.g., server site of synchronization manager 240). Once received, the server site may apply the updates to previously stored data (e.g., change logs) and send notifications to other computing devices associated with the user. To provide this functionality, synchronizer 210 may execute various types of operations. For example, operations may include receiving 502 the status of data locally stored on the computing device that executes synchronizer 210. For example, such status may be representative of one or more updates (e.g., based on user interaction) to the locally stored data. Upon receiving the status information, operations of synchronizer 210 may include determining 504 if one or more updates have occurred to the data resident on the computing device. If the data is still current and no updates have occurred, synchronizer 210 may return to receive additional status reports. Upon detecting a status change, operations may include requesting 506 a data transfer lock from the server site. In some arrangements, repetitive requests may be issued by synchronizer 210 over a period of time for establishing a transfer lock. As such, if synchronizer 210 is initially denied the transfer lock (e.g., a transfer lock has already been granted), repeated requests may allow a lock to be established when the server site is available.

Once the data transfer lock is established, operations of synchronizer 210 may include receiving 508 an update identifier from the server site to determine if the corresponding data residing on the computing device is current (compared to the data stored at the server site). In some arrangements, the update identifier may have been previously received (e.g., during operations associated with flowchart 400). To make the determination, synchronizer 210 may retrieve a counterpart update identifier that is stored on the computing device and compare 510 the two update identifiers. If the identifiers are not equivalent, an update (or multiple updates) may be present at the service site that is not reflected in the data stored at the computing device associated with the user. In such a situation, synchronizer 210 may call for the data located at the computing device to be updated prior to passing the locally detected data changes to the server site. As such, if the comparison does not indicate a match, operations may include requesting 516 removal of the established data transfer lock. Upon the lock being removed, synchronizer 210 may execute operations to update the data stored on the computing device. For example, operations associated with flowchart 400 (shown in FIG. 4) may be executed by synchronizer 210 to update the data.

For the situation in which synchronizer 210 determines that the update identifier received from the server site matches the locally stored update identifier, the synchronizer may continue to provide the locally detected updates to the server site. For example, operations may include sending 512 (e.g., uploading) the local update data to the server site. Based upon the update data being provided, the server site may use (e.g., add, merge, etc.) the information to update data currently being stored. Additionally, to reflect the update, the server site may change or adjust the particular update identifier associated with the updated data. Further, the newly adjusted update identifier may be provided to synchronizer 210 for future comparisons. As such, operations of synchronizer 210 may include receiving 514 the update identifier (from the server site) that reflects the recently provided data update to the server site. Typically, the update identifier (e.g., e-tag) is stored (e.g., on the storage device) for later retrieval, for example, to determine if update data is present at the server site and needs to be received by synchronizer 210. Upon receiving the update identifier, operations of synchronizer 210 include requesting 516 that the data transfer lock be removed since transfer operations are complete.

Figure 6:
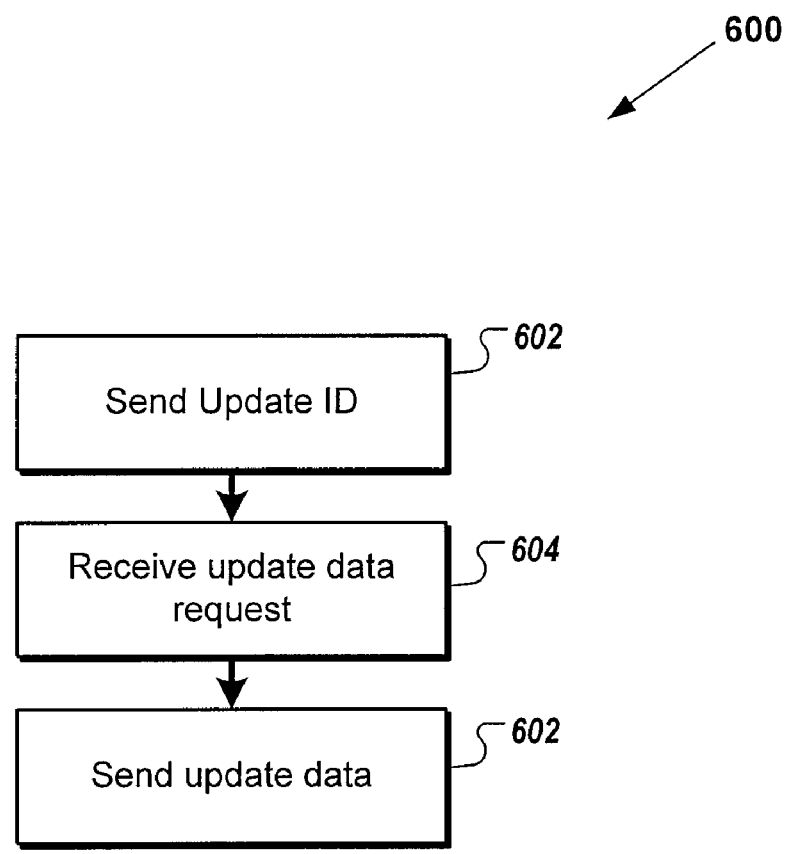
FIGS. 6, 7 and 8 are flow charts that represent operations of a synchronization manager.

Referring to FIG. 6, a flowchart 600 represents some of the operations of synchronization manager 240 (shown in FIG. 2). As mentioned above, synchronization manager 240 may be executed by a server or other type of computing device located at a server site. Along with being executed at a single site (e.g., synchronization server 230), operation execution may also be distributed among two or more computation devices. For example, some operations may be executed on two or more servers.

One capability of synchronization manager 240 is to manage data that resides on multiple computing devices associated with a user. For example, synchronization manager 240 may provide data updates to one or more of the computing devices. To provide this functionality, synchronization manager 240 may execute various types of operations. For example, operations of synchronization manager 240 may include sending 602 one or more update identifiers to the computing devices. One or more events may trigger the sending of such update identifiers, for example, a request received from one particular computing device may initiate one or more update identifiers being sent. Synchronization manager 240 may also independently initiate the sending of identifiers. For example, upon updating data being stored at synchronization server 230, notifications may be sent by the synchronization manager 240 to alert individual computing devices (associated with a user) that update data is available and to initiate synchronization.

Upon sending the update identifier, operations of the synchronization manager 240 may also include receiving 604 one or more requests to provide update data (to one or more computing devices). Based upon the request, operations may also include sending 606 the requested update data to the one or more computing devices. Additionally, the update data is typically sent without establishing a data transfer lock between the synchronization site (e.g., the synchronization server 230) and each of the one or more computing devices. As such, two or more computing devices may receive update data in parallel and time delays caused by serial data transfers are reduced.

Figure 7:
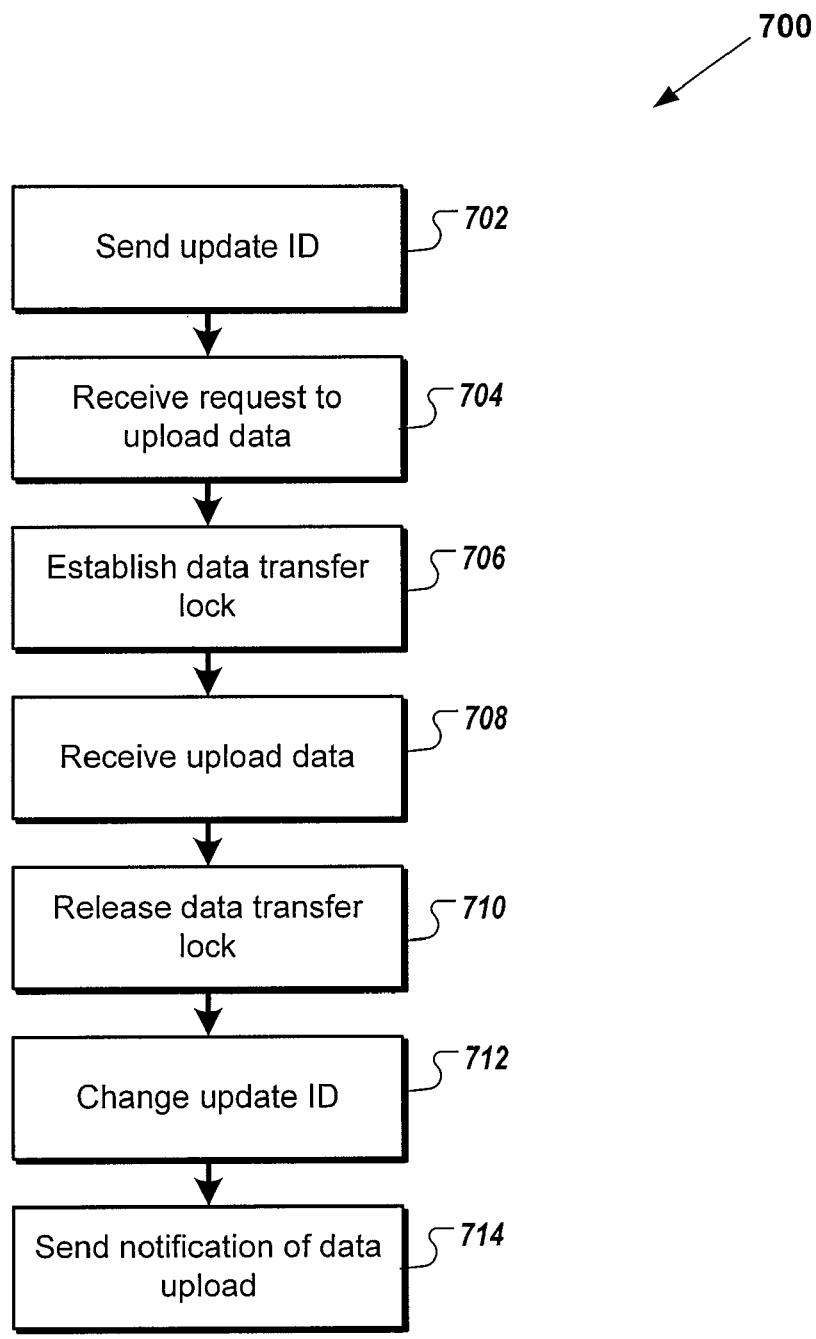

Referring to FIG. 7, a flowchart 700 represents additional operations of synchronization manager 230 (shown in FIG. 2). Similar to the operations shown in FIG. 6, synchronization manager 240 may be executed by a server or other type of computing device located at a server site. Along with being executed at a single site (e.g., synchronization server 240), operation execution may also be distributed among two or more computation devices, such as multiple servers.

Similar to the reading functionality of synchronization manager 240 described with respect to the flowchart 600, another capability of synchronization manager 240 is to receive data updates from a computing device associated with a user. To receive such an update, a data transfer lock is established with the source computing device. As such, while multiple computing devices may provide update in parallel from the server site, synchronization manager 240 is capable of receiving update data from a single computing device. To provide this functionality, synchronization manager 240 may execute various types of operations. For example, operations may include sending 702 one or more update identifiers to computing devices associated with a user. In one situation, such update identifiers may provide a notification (to the computing devices) that represents the current state of one or more data sets stored at a synchronization server. In some arrangements, this operation may be considered optional, for example, another function of synchronization manager 240 may provide the current update identifier to one or more computing devices.

Operations of synchronization manager 240 may also include receiving 704 a request to be provided update data from a computing device. For example, based upon the update identifier sent by synchronization manager 240, a computing device may determine that recent local data changes need to be uploaded to the synchronization server. Upon receiving the request, operations may include establishing 706 a data transfer lock with the requesting computing device. Once the lock is established, synchronization manager 240 may receive 708 the appropriate data from the computing device and release 710 the data transfer lock upon completion of the data transfer. Various operations and processes may be executed with the received data, for example, the data may update (e.g., added to, merged, etc.) with data stored at the synchronization server to reflect the provided changes. Also, while in this example the data transfer lock is released upon completion of the data transfer, removal of the lock may occur after the execution of other operations. Once the data has been transferred and the previously stored data updated, synchronization manager 240 may also execute operations to reflect the changes made to the stored data. For example, operations may include changing 712 the update identifier. Further, operations may include sending 714 notification of provided data. For example, synchronization manager 240 may send a message to each computing device as an alert to the data update.

Figure 8:
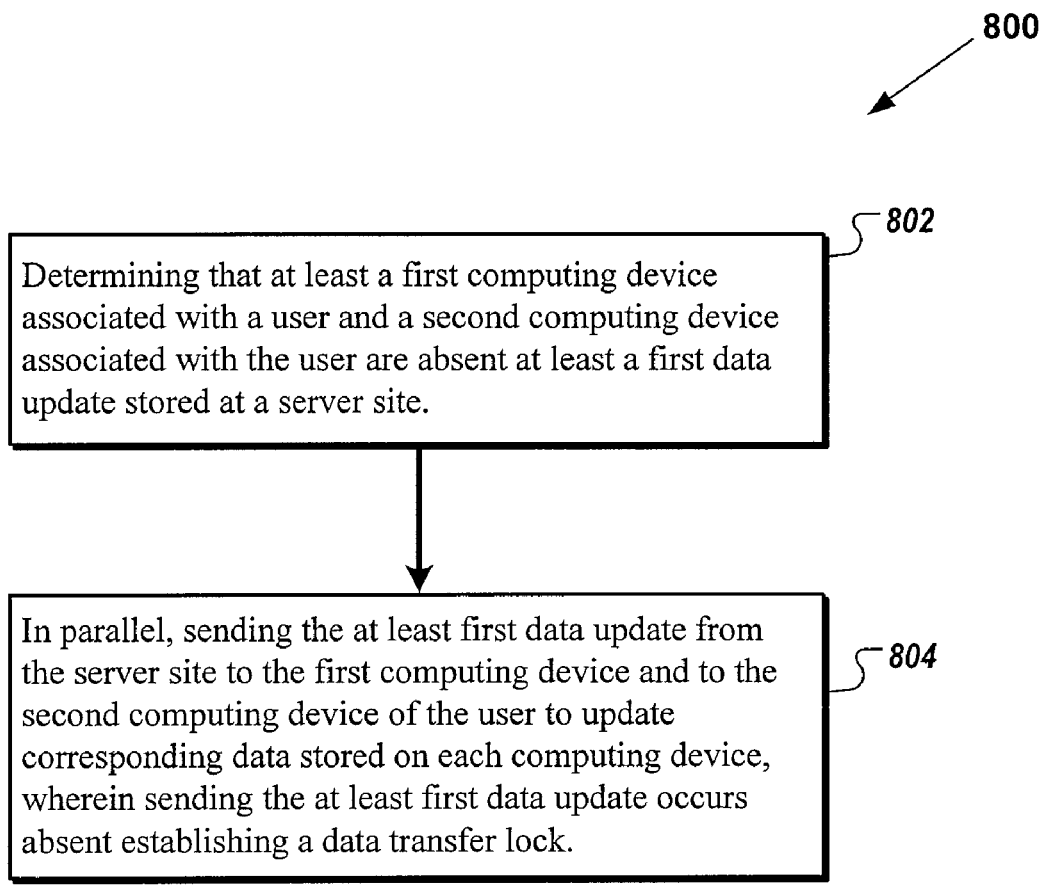

Referring to FIG. 8, a flowchart 800 represents additional operations of synchronization manager 240 (shown in FIG. 2). Similar to the operations shown in FIG. 7, synchronization manager 240 may be executed by a server or other type of computing device located at a server site. Along with being executed at a single site (e.g., synchronization server 230), operation execution may also be distributed among two or more computation devices, such as multiple servers.

Operations of synchronization manager 240 include determining 802 that at least a first computing device associated with a user and a second computing device associated with the user are absent at least a first data update stored at a server site. Operations of synchronization manager 240 also include, in parallel, sending 804 the at least first data update from the server site to the first computing device and to the second computing device of the user to update corresponding data stored on each computing device. Sending the at least first data update occurs absent establishing a data transfer lock.

Figure 9:
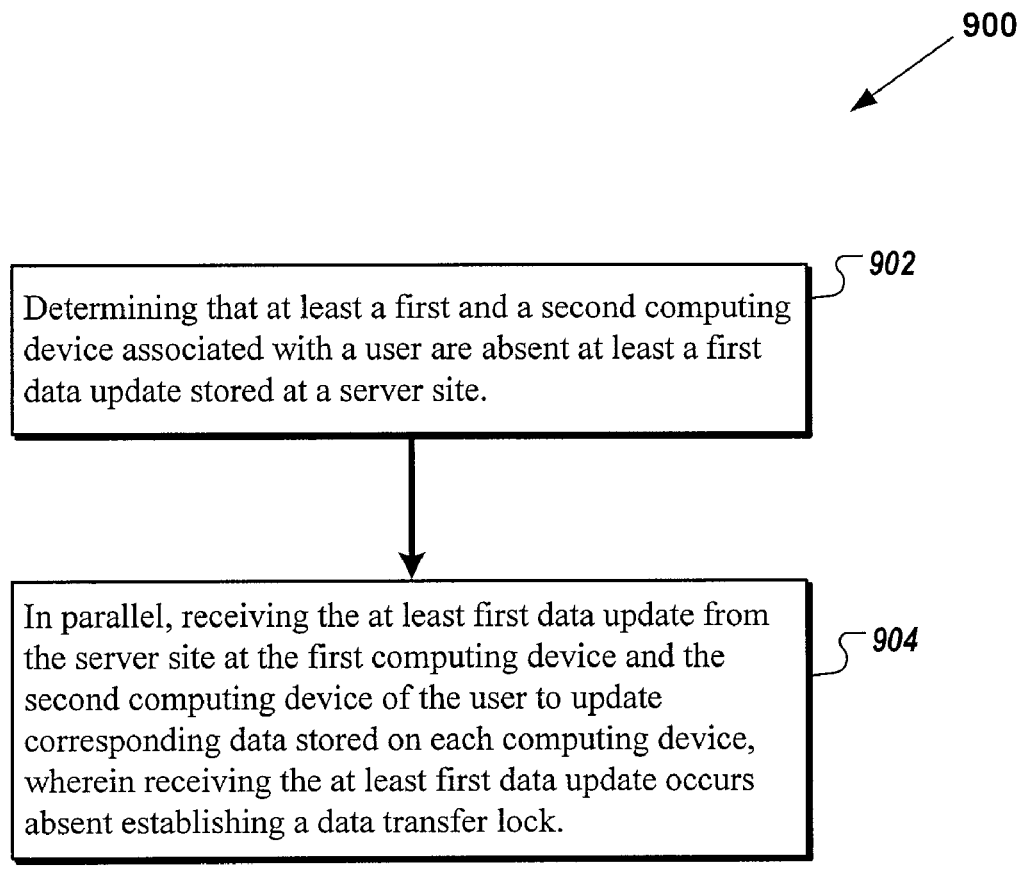

Referring to FIG. 9, a flowchart 900 represents additional operations of synchronizer 210 (shown in FIG. 2). Similar to the operations shown in FIG. 4, synchronizer 210 may be executed at one (of multiple) computing devices associated with a user. Further, along with executing the operations on a single computing device, execution may also be distributed among two or more computing devices.

Operations of synchronizer 210 include determining 902 that at least a first and a second computing device associated with a user are absent at least a first data update stored at a server site. Operations also of synchronizer 210 also include, in parallel, receiving 904 the at least first data update from the server site at the first computing device and the second computing device of the user to update corresponding data stored on each computing device. Receiving the at least first data update occurs absent establishing a data transfer lock.

Figure 10:
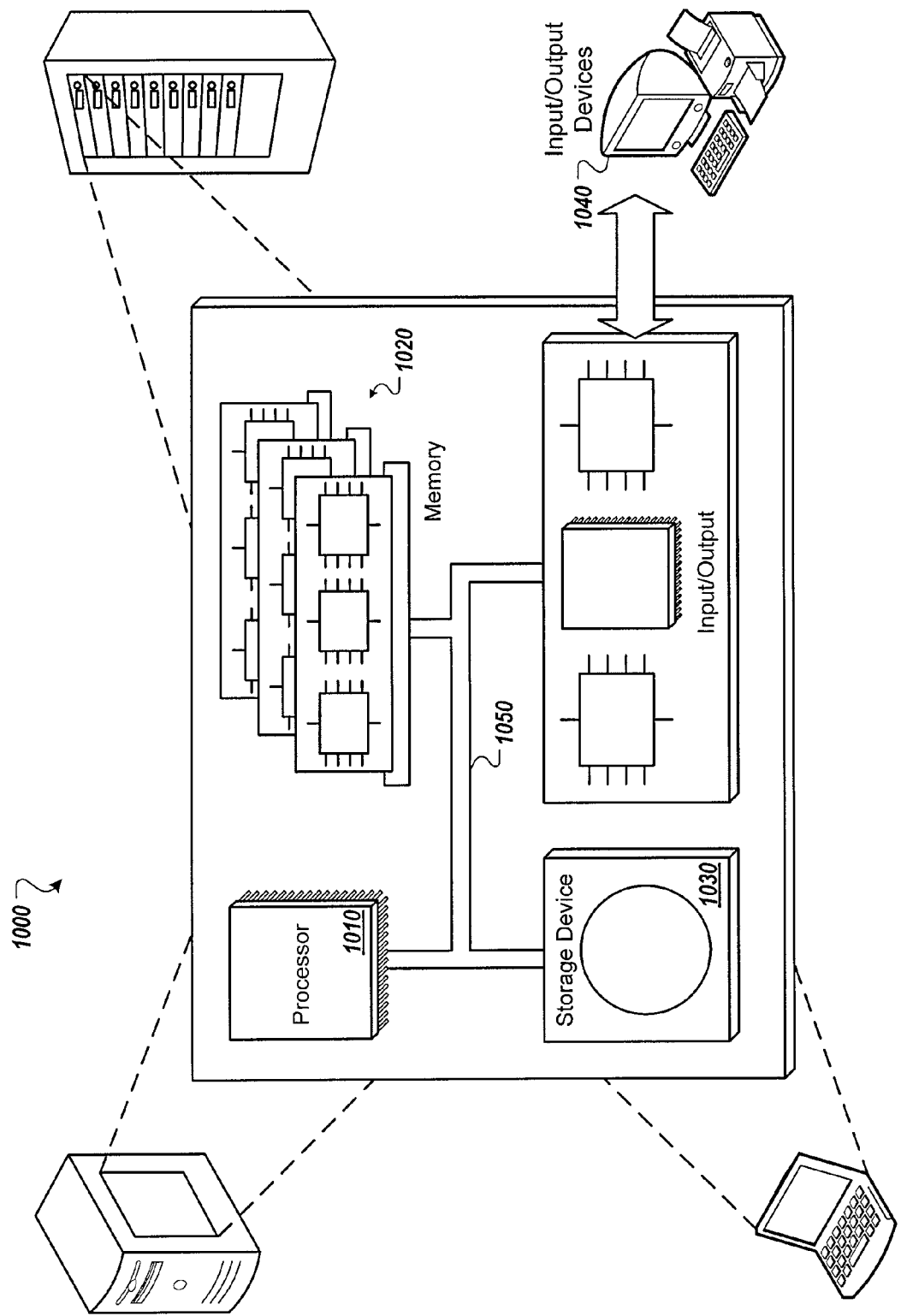
FIG. 10 represents a computer system and related components.

Referring to FIG. 10, a schematic diagram of a generic computer system 1000 is illustrated. The system 1000 can be used for the operations described in association with any of the computer-implemented methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 is a volatile memory unit in some implementations and is a non-volatile memory unit in other implementations.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims. For example, the techniques described herein can be performed in a different order and still achieve desirable results.

The invention claimed is:

1. A system comprising:
a server site comprising:
a memory for storing update data sets that correspond to data sets stored on multiple computing devices of a user; and
a synchronization manager for determining that at least a first computing device associated with the user is absent at least a first data update stored in the memory at the server site and a second computing device associated with the user is absent the first data update stored in the memory at the server site,
wherein the synchronization manager is configured to send in parallel, independent of a status of a write operation data transfer lock, the at least first data update to the first computing device and the second computing device of the user for updating the corresponding data stored on each computing device.

2. The system of claim 1, wherein the synchronization manager is further configured to receive a second data update in parallel with sending the at least first data update to the first and second computing device.

3. The system of claim 2, wherein the synchronization manager establishes a data transfer lock for receiving the second data update.

4. The system of claim 2, wherein the synchronization manager is configured to compare an update identifier stored in the memory and an update identifier stored at the first computing device to identify the first computing device being absent at least one data update.

5. A system comprising:
a first computing device associated with a user, comprising:
a memory for storing update data sets to update corresponding stored data sets, and
a synchronizer for determining that the first computing device is absent at least a first data update stored at a server site,
wherein the synchronizer is configured to receive the at least first data update from the server site independent of a status of a write operation data transfer lock and in parallel with a second computing device receiving the at least first data update independent of a status of a write operation data transfer lock.

6. The system of claim 5, wherein the second computing device is further configured to send a second data update to the server site in parallel with the first computing device receiving the at least first data update from the server site.

7. The system of claim 6, wherein the second computing device establishes a data transfer lock with the server site for sending the second data update.

8. The system of claim 7, wherein the synchronizer is further configured to compare an update identifier stored in the memory and an update identifier provided from the server site to identify the first computing device as being absent at least a first data update.

9. The system of claim 5, wherein upon receiving the at least first data update from the server site, the synchronizer is further configured to determine that the first computing device is absent a second data update.

10. A method, comprising:
determining that at least a first computing device associated with a user is absent at least a first data update stored at a server site and a second computing device associated with the user is absent the first data update stored at the server site; and
in parallel, sending the at least first data update from the server site to the first computing device and to the second computing device of the user to update corresponding data stored on each computing device,
wherein sending the at least first data update occurs independent of a status of a write operation data transfer lock.

11. The method of claim 10 further comprising:
in parallel with sending the at least first data update to the first and second computing devices from the server site, receiving a second data update at the server site.

12. The method of claim 11, wherein receiving the second data update at the server site includes establishing a data transfer lock.

13. The method of claim 11, wherein determining the first computing device and the second computing device are absent the at least first data update includes comparing an update identifier stored at the server site and an update identifier stored at the first computing device, and comparing the update identifier stored at the server and an update identifier stored at the second computing device.

14. A method comprising:
determining that at least a first and a second computing device associated with a user are absent at least a first data update stored at a server site; and
in parallel, receiving the at least first data update from the server site at the first computing device and the second computing device of the user to update corresponding data stored on each computing device,
wherein receiving the at least first data update occurs independent of a status of a write operation data transfer lock.

15. The method of claim 14, further comprising:
in parallel with receiving the at least first data update at the first and second computing devices from the server site, sending a second data update from a third computing device associated with the user to the server site.

16. The method of claim 15, wherein sending the second data update to the server site includes establishing a data transfer lock between the third computing device and the server site.

17. The method of claim 15, further comprising:
comparing an update identifier from the server site to an update identifier at the third computing device to determine to send the second data update from the third computing device to the server site.

18. The method of claim 14, further comprising determining that the first computing device is absent a second data update, upon receiving the at least first data update from the server site.

19. One or more computer readable storage devices storing instructions that are executable by a processing device, and upon such execution cause the processing device to perform operations comprising:
determining that at least a first computing device associated with a user is absent at least a first data update stored at a server site and a second computing device associated with the user is absent the first data update stored at the server site; and
in parallel, sending the at least first data update from the server site to the first computing device and to the second computing device of the user to update corresponding data stored on each computing device, wherein sending the at least first data update occurs independent of a status of a write operation data transfer lock.

20. The computer readable storage devices of claim 19, further comprising instructions to cause the processing device to perform operations comprising:

in parallel with sending the at least first data update to the first and second computing devices from the server site, receiving a second data update at the server site.

21. The computer readable storage devices of claim 20, wherein receiving the second data update at the server site includes establishing a data transfer lock.

22. The computer readable storage devices of claim 20, wherein determining the first computing device and the second computing device are absent the at least first data update includes comparing an update identifier stored at the server site and an update identifier stored at the first computing device, and comparing the update identifier stored at the server and an update identifier stored at the second computing device.

23. One or more computer readable storage devices storing instructions that are executable by a processing device, and upon such execution cause the processing device to perform operations comprising:

determining that at least a first and a second computing device associated with a user are absent at least a first data update stored at a server site; and in parallel, receiving the at least first data update from the server site at the first computing device and the second computing device of the user to update corresponding data stored on each computing device, wherein receiving the at least first data update occurs independent of a status of a write operation data transfer lock.

24. The computer readable storage devices of claim 23, further comprising instructions to cause the processing device to perform operations comprising:

in parallel with receiving the at least first data update at the first and second computing devices from the server site, sending a second data update from a third computing device associated with the user to the server site.

25. The computer readable storage devices of claim 24, wherein sending the second data update to the server site includes establishing a data transfer lock between the third computing device and the server site.

26. The computer readable storage devices of claim 25, further comprising instructions to cause the processing device to perform operations comprising:

comparing an update identifier from the server site to an update identifier at the third computing device to determine to send the second data update from the third computing device to the server site.

* * * * *